June 3, 1958  F. A. SCHAUFELBERGER  2,837,406
HYDROMETALLURGICAL PROCESS
Filed May 5, 1955
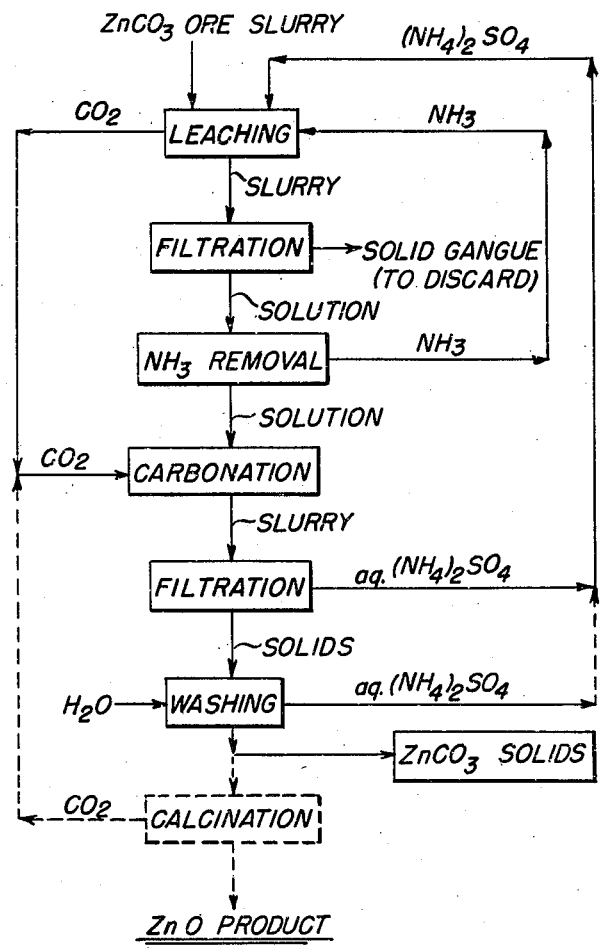
INVENTOR.
FELIX A. SCHAUFELBERGER
BY *Harry A. Kline*
ATTORNEY.

2,837,406
Patented June 3, 1958

2,837,406

HYDROMETALLURGICAL PROCESS

Felix A. Schaufelberger, Rye, N. Y., assignor to Chemical Construction Corporation, New York, N. Y., a corporation of Delaware Application May 5, 1955, Serial No. 506,258

13 Claims. (Cl. 23—147)

This invention is concerned with the hydrometallurgical treatment of ores of oxidized minerals, and particularly, carbonates. Still more particularly, it relates to a process for the economical extraction and recovery from such ores of values of those metals that are capable of forming soluble ammine complexes.

Deposits of ores of oxidized or non-sulfide minerals occur in many parts of the world. Some of these contain zinc-bearing or copper-bearing carbonate minerals. Among the latter may be mentioned smithsonite ($ZnCO_3$), hydrozincite ($2ZnCO_3 \cdot 3Zn(OH)_2$), and malachite ($CuCO_3 \cdot Cu(OH)_2$). Unfortunately, despite their availability, such minerals have not been generally amenable to economic metal recovery by hydrometallurgical methods, and consequently, little commercial exploitation has been accomplished.

Although hydrometallurgical methods have been proposed for separating such minerals from their ores, they have not been widely used. One such is conventional froth flotation. This method is not too satisfactory because an economic reagent is not known at present to effect the separation. Additionally, for economic considerations, the resultant carbonate ore concentrates require a calcining treatment to increase their metal value content. Another method commonly employed is one which involves the leaching of the desired metal value from a slurry of such ore with an ammoniacal carbonate solution and recovering therefrom pregnant liquor containing dissolved metal values. Such liquor is usually dilute in metal values and is often concentrated by being evaporated to precipitate a basic metal product. The evaporation step is one of the principal difficulties with the process because a gas mixture of ammonia, carbon dioxide and water vapor is evolved during evaporation. Unfortunately, the ammonia-bearing mixture cannot be directly returned to the leaching operation for the reason that resultant carbon dioxide build-up ultimately prevents further leaching. Hence, the gas mixture must be separated into its components. Recovered ammonia is reused in the leaching operation and the carbon dioxide is discarded along with sufficient water vapor to maintain a proper water balance in the leaching circuit. Of the many techniques presently available to separate ammonia and carbon dioxide, each depends upon selective separation methods. These are inherently costly, particularly in view of the large volumes of gases to be treated per unit of metal which is commonly recovered in this over-all process.

It is therefore a principal object of the present invention to provide an economical method for selectively extracting valuable minerals from these oxidized ores by an ammoniacal leach solution. A still further object is to provide a process wherein the necessity for an ammonia-carbon dioxide separation is obviated. Additional objects will become apparent from the description hereinafter set forth.

To this end, an improved process is made available in which ores, characterized as containing either zinc-bearing or copper-bearing oxide or carbonate minerals, may be treated in a straightforward manner to separate desired metal carbonates and/or oxides therefrom. It is particularly surprising to find one may effect mineral recovery by the process of the present invention which employs relatively low temperatures and pressures. It is further surprisingly possible to recover metal values by a process in which an ammonia-carbon dioxide gas separation is not encountered.

In general, the over-all process may be simply stated. A suitable ore, whether crude or concentrate, containing an oxidized mineral of a metal capable of forming an ammine complex ion is slurried in water. Ammonia and an ammonium salt of a strong acid are added thereto, directly or in stages, in sufficient amounts to adjust the solute content thereof to provide for the formation of water-soluble polyammine complex salts of the desired metals. Such polyammine complex should contain at least about 2.5, but not more than about 4, mols of ammonia (as ammine) per atom of metal. Under these conditions, at a temperature of at least about 50° C., effective leaching of the ore is readily effectuated. Surprisingly, resultant carbon dioxide has been observed as being substantially insoluble in the leach liquor. Thus, the carbon dioxide is released from the slurry but is recovered for further use. Resultant slurry is then filtered to remove undissolved or gangue material. Controlled evaporation of the solutions follows to release only a preselected portion of the ammonia in the polyammine complex. Recovered carbon dioxide is next added to resultant evaporated solution in amount sufficient to precipitate a metal carbonate in the solution containing soluble ammonium salt of the strong acid. The precipitate is filtered and, if desired, it may be optionally calcined to obtain the corresponding oxide. Separately recovered ammonia, carbon dioxide and the ammonium salt of the strong acid are reused when needed.

A detailed description of the invention may be more readily followed by reference to the accompanying drawing. It illustrates a simplified flow diagram of the principal steps of the process of the invention involving the treatment of a zinc carbonate-bearing ore. However, copper-bearing ores are intended to be similarly treated and are therefore included within the purview of the invention.

An ore containing about 19% Zn as $ZnCO_3$ is slurried in water and is fed into a conventional reaction vessel in which ammonia and ammonium sulfate are added in amounts sufficient to provide for a mol ratio of $NH_3$ to each atom of dissolved zinc of from 2.5–4:1, and preferably from 3.5–3.8:1. Advantageously, the ammonia is added stepwise until the desired mol ratio is achieved. Surprisingly, released carbon dioxide is found to be insoluble in this environment and, therefore, does not form either ammonium carbonate or carbonic acid. During leaching, substantially all the carbon dioxide is released and removed as such. The zinc content, in the form of zinc polyammine sulfate, is soluble in the ammonium sulfate solution and resultant slurry is filtered.

It is a feature of the leaching step that it is carried out at a temperature sufficiently high to prevent substantial physical solution of the carbon dioxide in the liquid. Ordinarily, this can be done at temperatures above about 50° C. The maximum leaching temperature, however, should be lower than that at which the metal ammine salt solution begins to evolve excessive ammonia. Ordinarily, therefore, it should not be higher than about 110° C. A good practical operating temperature range during the execution of this step is one maintained at from about 80° to about 100° C. In this preferred range, pure carbon dioxide escapes almost quantitatively. A substantially carbon dioxide-free, zinc polyammine sulfate solution is left behind.

The next step shown on the drawing is the removal of slurry in the form of pregnant solution containing insolubles to a filtering zone. Undissolved or gangue material is separated from the pregnant solution. The material is then discarded. The latter solution is evaporated in a conventional evaporator designated by "$NH_3$-Removal" on the drawing. The prime purpose of this step is to recover ammonia while maintaining most, if not all, of the zinc value in solution. Accordingly, this is accomplished by heating the solution advantageously, but not necessarily, under atmospheric pressure to decompose the zinc polyammine sulfate as obtained from the leaching operation. Such heating reduces the mol ratio of $NH_3$:dissolved zinc to at least about 2.2 or lower, and preferably from 1.8–2.1, thereby releasing ammonia which can be recovered for reuse. The decomposing temperature at normal pressure will vary somewhat with the particular metal salt used and with the quantity of dissolved ammonium sulfate or other ammonium salt in solution; but in general is above about 100° C. and advantageously from about 110° C. to about 130° C. Stated otherwise, the ammine complex salt, may be decomposed from the tetrammine level, for example, to at least about the diammine level or lower by heating the tetrammine complex at atmospheric pressure above about 100° C. Evolved ammonia, which can, if desired, be recycled directly to the leaching step, is in a substantially pure state, the only other material being water vapor. A temperature with range of from about 115° C. to about 125° C. constitutes a good average practice. However, correspondingly lower temperatures are employed where the evaporation is carried out under vacuum.

On the drawing, the remaining evaporated solution is sent to the "carbonation" step. Precipitation of zinc as zinc carbonate is initiated by increasing the carbonate content of the solution. This is conveniently done by subjecting the solution to an atmosphere of carbon dioxide at a mild pressure of about 0–500 pounds per square inch gauge. Treatment is continued until substantially all the zinc values are converted to zinc carbonate. The latter is insoluble in the ammonium sulfate solution. As illustrated on the drawing, the carbon dioxide used in this step is obtained from either the leaching or a subsequent calcination step or both.

The zinc carbonate-ammonium sulfate slurry is next filtered. Recovered solution containing ammonium sulfate is sent to the leaching step to treat a fresh batch of ore. Resultant zinc carbonate is washed with water to remove any occluded sulfate, then dried and recovered as a solid. The wash water is discarded or optionally added to the previous recovered solution as shown by the dotted lines in the drawing. If desired, the zinc carbonate may be optionally calcined by heating the latter in a "calcination" vessel at a temperature from about 300° C. to about 350° C., preferably about 325° C., as shown by the dotted lines. Evolved carbon dioxide may then be sent to "carbonation," as shown also by the dotted lines on the drawing.

The advantages inherent in the process of the invention are multifold. Carbon dioxide gas is not dissolved in the ammoniacal solution. Further, in the evaporation treatment, a troublesome gaseous mixture of amomnia and carbon dioxide, which requires its separation into pure gases, is not encountered. As stated previously, the process of the invention lends itself particularly to the treatment of low grade zinc- and copper-bearing carbonate ores which, for economic considerations, could not be profitably developed. High temperatures and superatmospheric pressures in the leaching stage are unnecessary. Accordingly, ores that contain zinc-bearing and copper-bearing oxidized minerals, such as smithsonite, hydrozincite, calamine, zinc oxide, and malachite, can now be economically treated hydrometallurgically by the aforedescribed process of the invention.

While ammonium sulfate has been employed illustratively in the drawing, any water-soluble ammonium salt of a strong mineral acid may be used. For example, ammonium halides, such as ammonium chloride or ammonium bromide, and ammonium nitrate can all be used in place of ammonium sulfate. The sulfate anion is preferred because of its relative non-corrodibility and cheapness.

The following examples will illustrate the use of the present invention. These examples are not intended to be construed as limitative of the invention. Unless otherwise stated, the parts given are by weight.

*Example 1*

153 parts of a smithsonite ore containing 19% Zn as $ZnCO_3$ in a gangue consisting essentially of dolomite is fed into a reaction vessel to which 1000 parts by volume of a leach solution containing 290 gms. of ammonium sulfate per liter and 12.2 gms. of ammonia per liter are added to a vessel in the conventional manner. The vessel contents are heated with agitation to about 65° C. An additional 307 parts of the ore along with sufficient ammonia to provide a total of about 36.7 gms. of ammonia per liter of leach solution are then added in small increments over a two-hour period, while slowly raising the temperature from about 65° C. to 95° C. As leaching of the ore progresses, carbon dioxide is released and collected for reuse. The amount of ammonia content in the withdrawn carbon dioxide gas is less than 0.1% by volume. These ammonia traces can be conveniently recovered from the carbon dioxide by scrubbing in a dilute aqueous sulfuric acid solution. Resultant ammonium sulfate so-formed is utilized as such in leaching.

The pregnant leach liquor is next filtered to separate the gangue which is discarded. Recovered leach liquor analyzes in grams per liter as follows:

| | |
|---|---|
| Zn | 78.4 |
| $NH_3$ | 77.5 |
| $(NH_4)_2SO_4$ | 152.0 |
| $CO_2$ | <0.1 |

The leach liquor is heated under atmospheric pressure at about 110° C. until about 45% ammonia is removed and recovered. Remaining solution, on analysis, contains 2.1 mols ammonia (as ammine) per atom of zinc. This solution is next treated with carbon dioxide under a pressure of 120 p. s. i. in a vessel suitably agitated. Ninety-five percent zinc as zinc carbonate precipitates. The precipitate is then filtered, washed free of sulfate with water, dried and calcined at 325° C. to furnish pure zinc oxide. Resultant filtrate is recycled to the leaching operation.

*Example 2*

The procedure of Example 1 is repeated except that 351 gms. of ammonium nitrate replaced the ammonium sulfate of Example 1. The leach liquor analyzes in grams per liter:

| | |
|---|---|
| Zn | 78.4 |
| $NH_3$ | 77.5 |
| $NH_4NO_3$ | 184.0 |
| $CO_2$ | <0.1 |

The leach liquor after treatment as set forth in Example 1 yields substantially 95% zinc as zinc carbonate.

*Example 3*

Into a conventional leaching vessel, 400 gms. of a malachite ore containing 11% copper are gradually added with agitation to 1000 parts by volume of a leach solution containing 215 gms. of $(NH_4)_2SO_4$ per liter and 8 gms. of ammonia per liter, while maintaining the contents therein at a temperature of about 60° C. As the ore is added, additional ammonia is introduced so as to make up a total of 20.9 gms. of ammonia added per liter. The leaching temperature is slowly increased from 60° C. to about 95° C. over a period of 2 hours. In all, about 92% extraction of the copper value is thereby achieved. All the carbon dioxide is liberated and driven off so as to recover a carbon dioxide gas, free from ammonia. After separating the gangue from the leach liquor, the solution analyzes in grams per liter as follows:

| | |
|---|---|
| Cu | 40.4 |
| $NH_3$ | 42.7 |
| $(NH_4)_2SO_4$ | 130.0 |
| $CO_2$ | <0.1 |

The leach liquor is thereafter heated under atmospheric pressure at about 115° C. until about 43.6% of the ammonia is removed and recovered. Remaining solution contains about 2.2 mols ammonia (as ammine) per atom of copper. This solution is next treated with carbon dioxide under a pressure of 150 p. s. i. in a vessel that is suitably agitated. Substantially all of the copper as basic copper carbonate is precipitated. The precipitate is then filtered, washed free of sulfate, dried and is calcined at 300° C. to furnish pure copper oxide. Resultant filtrate is recycled to the leaching operation.

I claim:

1. In the hydrometallurgical separation of metal values from metal bearing carbonate ores containing an oxidized mineral of a metal capable of forming an ammine complex, the process of which comprises the steps of: forming an aqueous slurry of said metal carbonate ore, adjusting the solute content thereof by the addition of sufficient ammonia and an ammonium salt of a strong inorganic acid while maintaining the reactants at a temperature of at least 50° C. but below about 110° C., to provide a leach liquor containing a soluble metal polyammine salt complex having at least 2.5 mols but not more than 4 mols of ammonia per atom of metal and carbon dioxide being substantially insoluble therein, removing said insoluble carbon dioxide from said leach liquor, and recovering metal polyammine salt complex.

2. The process according to claim 1 in which the metal carbonate ore contains a metal selected from the group consisting of zinc and copper.

3. The process according to claim 1 in which the metal is zinc.

4. The process according to claim 1 in which the metal is copper.

5. The process according to claim 1 in which the ammonium salt of a strong acid is ammonium sulfate.

6. The process according to claim 1 in which sufficient ammonia is added to form a metal polyammine salt complex containing from about 3.5 mols to about 3.8 mols of ammonia per atom of metal.

7. The process for a hydrometallurgical separation of metal values from metal bearing carbonate ores containing an oxidized mineral of a metal capable of forming an ammine complex which comprises the steps of: forming an aqueous slurry of said metal carbonate ore, adjusting the solute content thereof by the addition thereto of sufficient ammonia and an ammonium salt of a strong inorganic acid until carbon dioxide being substantially insoluble in said aqueous medium and a soluble metal polyammine salt complex having at least 2.5 mols but not more than 4 mols of ammonia per atom of metal are formed therein while maintaining the admixture at a temperature of at least about 50° C. but below about 110° C., releasing the latter carbon dioxide for reuse, filtering resultant solution containing dissolved metal polyammine complex salt, heating the solution to adjust the ammonia content of the said complex salt to not more than about 2.2 mols of ammonia per mol of metal at a temperature of at least above 110° C. but not more than about 130° C., removing ammonia thus recovered for reuse, treating resultant solution with carbon dioxide, forming an aqueous mixture of insoluble metal carbonate and soluble ammonium salt of the inorganic strong acid, filtering insoluble metal carbonate therefrom, and calcining the metal carbonate to recover metal oxide.

8. The process according to claim 7 in which the metal is selected from the group consisting of zinc and copper.

9. The process according to claim 7 in which the metal is zinc.

10. The process according to claim 7 in which the metal is copper.

11. The process according to claim 7 in which the ammonium salt of the strong acid is ammonium sulfate.

12. The process according to claim 7 in which sufficient ammonia is added to form a metal polyammine salt complex containing from about 3.5 mols to about 3.8 mols of ammonia per atom of metal.

13. The process according to claim 7 in which the temperature of the admixture prior to carbon dioxide removal is maintained at a temperature from about 80° C. to about 100° C.

References Cited in the file of this patent

UNITED STATES PATENTS

| | | |
|---|---|---|
| 623,154 | Howard | Apr. 18, 1899 |
| 1,608,844 | Edwards et al. | Nov. 30, 1926 |
| 2,726,934 | Forward et al. | Dec. 13, 1955 |

OTHER REFERENCES

Mellor: "Comprehensive Treatise on Inorganic and Theoretical Chemistry," vol. 3, pages 132 and 275.